United States Patent [19]

Mizuno

[11] Patent Number: 5,028,767
[45] Date of Patent: Jul. 2, 1991

[54] SEALED HOLDER FOR IC CARD

[75] Inventor: Yutaka Mizuno, Hachioji, Japan

[73] Assignee: Fanuc Ltd., Minamitsuru, Japan

[21] Appl. No.: 315,787

[22] PCT Filed: Aug. 31, 1988

[86] PCT No.: PCT/JP88/00869

§ 371 Date: Feb. 21, 1989

§ 102(e) Date: Feb. 21, 1989

[87] PCT Pub. No.: WO89/02138

PCT Pub. Date: Mar. 9, 1989

[30] Foreign Application Priority Data

Aug. 31, 1987 [JP] Japan .................................. 62-217346

[51] Int. Cl.$^5$ .............................................. G06K 7/04
[52] U.S. Cl. ..................................... 235/441; 235/475; 235/482
[58] Field of Search ................. 235/444, 475, 479, 80, 235/483, 486, 492, 441, 482

[56] References Cited

U.S. PATENT DOCUMENTS

| | | | |
|---|---|---|---|
| 3,866,827 | 2/1975 | Obata et al. | 235/482 X |
| 4,724,310 | 2/1988 | Shimamura et al. | 235/441 X |
| 4,743,746 | 5/1988 | Murschall et al. | 235/441 X |
| 4,931,622 | 6/1990 | Ohtsuki et al. | 235/441 X |

Primary Examiner—Stuart S. Levy
Assistant Examiner—Steven M. duBois
Attorney, Agent, or Firm—Staas & Halsey

[57] ABSTRACT

A sealed holder for an IC card formed into a card shape and having an imbedded IC chip such as a semiconductor integrated circuit. A card socket (30) is arranged within a holder housing (10), and an insertion/ejection port for the IC card (20) is closed by a pivoting door (1) to seal the holder. Linkage and transmission means are operatively associated with the door to facilitate insertion and withdrawal of the IC card.

9 Claims, 2 Drawing Sheets

SEALED HOLDER FOR IC CARD

DESCRIPTION

1. Technical Field

This invention relates to an IC card sealed holder for accommodating and retaining an IC card incorporating an integrated circuit.

2. Background Art

Magnetic cards in which a magnetic stripe serves as a memory medium are widely utilized as cash cards and credit cards in on-line systems at banks and the like.

Though such magnetic cards can be manufactured at low cost, they have a small memory capacity and there is the danger that stored data may be erased by an external magnetic force. Consequently, in recent years IC cards of larger memory capacity have been developed in which data will not be affected by external magnetism.

An IC card of this type has an internal processor and memory in the form of a CMOS integrated circuit. When data is written or read from the IC card, a plurality of contact portions of an IC card connector serving as input/output terminals of the integrated circuit are connected to a card socket having a plurality of corresponding contacts, and an exchange of data is performed between the card and a card reader or card writer via the socket.

With a conventional IC card of this kind, the card is connected to or withdrawn from the card socket by pushing the card in or pulling the card out with the fingers on one's hand. Accordingly, the connector portion on the IC card side is provided with a shutter, which is closed when solely the card is handled, thereby preventing one's hand from touching the contact portion.

However, in the case where an IC card reader or writer is used in a poor air quality environment such as in a factory, it is required not only to protect the IC card but also to provide a dust-proof structure for the card reader or card writer per se. The reason is the risk of the IC card connector portion becoming contaminated when the card is inserted into the card socket. Accordingly, it is necessary to assure the seal of the IC card holder and also to facilitate the insertion and withdrawal of the card as by providing the insertion port of the IC card holder with a door or the like, by way of example.

Furthermore, when the IC card is extracted from the IC card holder by the mechanical force of an elastic member or the like, labor is required to adjust the mechanical force. If the force is maladjusted, there is the danger that the IC card may spring out of the insertion port of the IC card holder and fall, with the IC card being damaged by the impact.

SUMMARY OF THE INVENTION

The present invention has been devised in order to solve the foregoing problems and it is an object of the present invention to provide an IC card sealed holder so adapted that an IC card connector may be reliably connected to a card socket, the card can be inserted into and withdrawn from a card reader or card writer through a simple operation, and the application of inadvertent impact to the card is prevented.

According to the present invention, there is provided a sealed holder in which an IC card formed into a card shape and having an imbedded IC chip is accommodated in withdrawable and insertable fashion in order to perform a transfer of data via a connector portion provided on a front end face of the card, comprising a holder housing formed to have an insertion/ejection port for the IC card, a card socket provided within the holder housing at a position at which a distance between the card socket and the insertion/withdrawal port is equal to a distance between front and rear end faces of the IC card inserted therein, a pivoting door pivotally supported on the holder housing and adapted to be turned while the rear end face of the IC card inserted therein is pushed, thereby closing the insertion/ejection port so as to hold the interior of the holder housing in a sealed state, and means operatively associated with a turning operation for opening the pivoting door for extracting the IC card from the card socket.

Thus, the sealed holder for an IC card according to the invention is such that the operation of closing the pivoting door of the holder housing pushes the rear end face of the IC card in the horizontal direction to mate and connect the end connector portion of the IC card with the card socket. When the door is opened, the IC card is pulled out of the card socket in operative association with the turning of the door. As a result, the insertion and withdrawal of the IC card can easily be performed through a simple operation. Moreover, since an elastic member such as a spring is not employed, the risk of damage to the card is eliminated.

BEST MODE FOR CARRYING OUT THE INVENTION

An embodiment of the present invention will now be described in detail with reference to the drawings.

Figure 3:
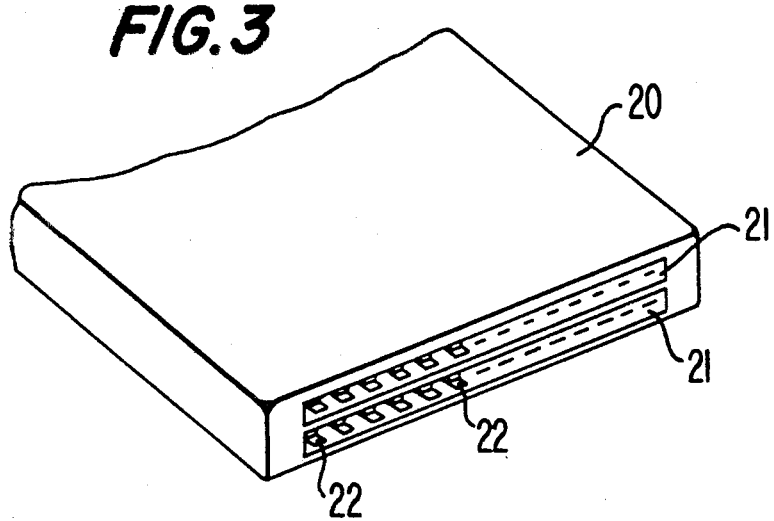
FIG. 3 is a partial perspective view showing a connector portion of an IC card.

FIG. 3 illustrates part of an IC card 20 having a front end face provided with an IC card connector portion. The front end face, which corresponds to the short side of the IC card 20 formed into a rectangular card shape having a predetermined thickness, is provided with two slender grooves 21, one located above the other. Mounted within the grooves 21 are a plurality of contacts 22 serving as input/output terminals of an integrated circuit incorporated in the IC card 20. These contacts form a connector portion.

The contacts 22 employ tongue pieces of a thin, plate-shaped metal (e.g., a phosphor bronze plate) having elasticity. The base portions of the contacts are connected to predetermined terminals of the integrated circuit within the IC card 20, and the other ends thereof are brought into contact with the pins of a card socket, described below, whereby data may be exchanged with the integrated circuit.

Figure 1:
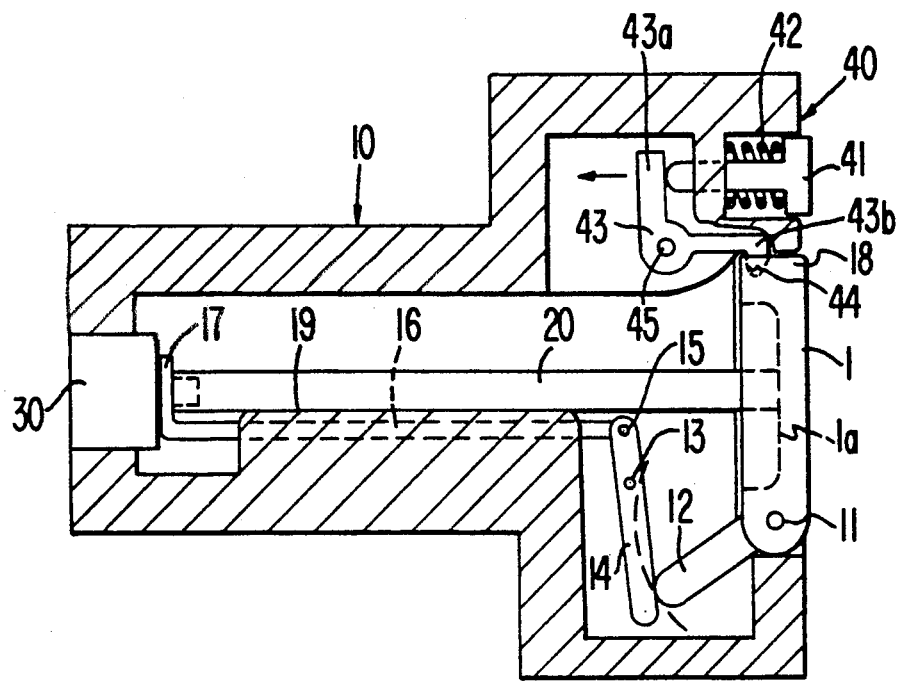
FIG. 1 is a longitudinal sectional view illustrating an embodiment of the present invention.

FIG. 1 is a longitudinal sectional view illustrating a sealed holder in a state where the IC card is accommodated within a holder housing and connected to a card socket.

The numeral 10 denotes a holder housing formed to have an insertion/ejection port for the IC card 20. The interior of the housing 10 has enough depth to retain the IC card 20 horizontally with its connector portion side facing the front. The height of the space within the holder housing 10 corresponds to the maximum thickness of the IC card used. The insertion/ejection port is provided with a freely pivoting door 1 which opens and closes on the outer side through a predetermined angle. The upper and lower portions of the holder housing 10 at the insertion/ejection port are formed to have spaces for respectively accommodating a door locking mechanism and transmission members, such as links, described below. A card socket 30 which can be exchanged to conform to the IC card inserted therein is secured as by screws within the deepest part of the holder housing 10 on the side opposite the insertion/ejection port at a position conforming to the distance between the front and rear end faces of the IC card.

Figure 2:
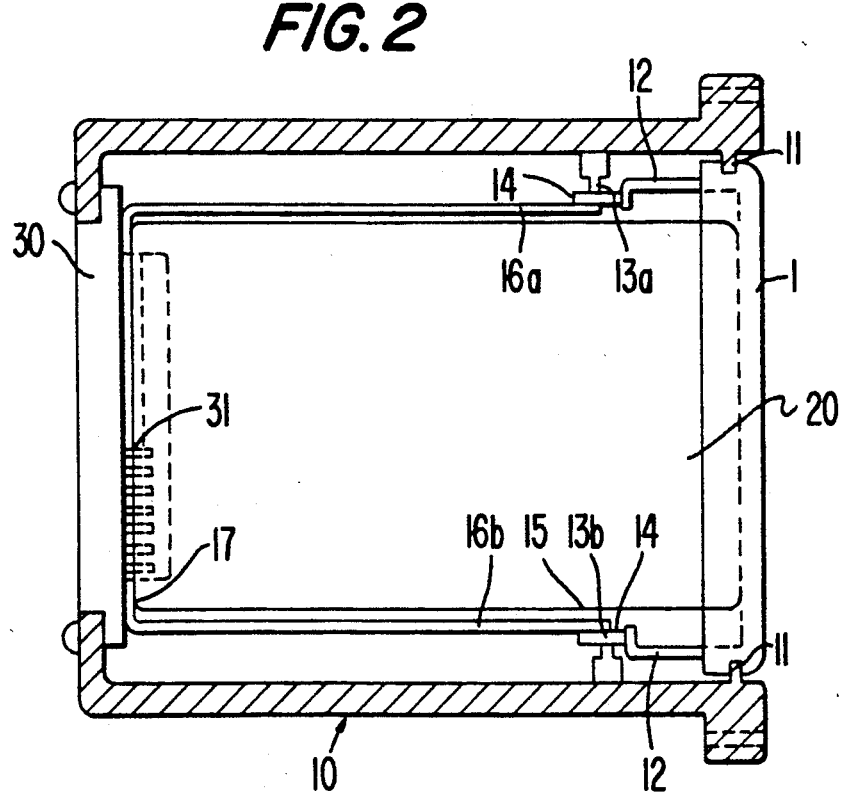
FIG. 2 is a transverse sectional view of the same embodiment.

Upon being closed, the pivoting door 1 prevents dust from penetrating the interior of the holder housing 10. When the IC card 20 is inserted, the door 1 pivots while pushing the rear end face of the IC card 20 in the horizontal direction at a recess 1a formed on the inner side of the door, whereby pins 31 in the card socket 30 are mated with the corresponding contacts 22 of the IC card 20 as shown in FIG. 2. More specifically, the pivoting door 1 is pivotally supported by a shaft 11 at the lower edge of the insertion/ejection port of holder housing 10 and is biased about the shaft by suitable means at all times in a rotational direction which will close the port.

Numeral 12 denotes links provided on both sides of the base portion of the pivoting door 1 and projecting obliquely downward into the holder housing 10. Each link 12 is a rod which, in operative association with the pivoting motion of pivoting door 1 to open the door, turns about the shaft 11 to raise its free end. Pivoting arms 14 are freely pivotally supported on rotating shafts 13a, 13b secured to both side faces of the housing 10 at positions slighter higher than the position of the support shaft 11 of door 1. These arms are turned clockwise when the free ends of the links 12 are raised. The pivoting arms 14, along with the links 12, constitute transmission means which operates when the IC card is extracted.

The upper end portions of the pivoting arms 14 extend to points directly below the inserted IC card 20 and are connected by pins 15 to the ends of follower slide arms 16a, 16b. The distal end portions of the follower slide arms 16a, 16b are bent inward and have engagement portions 17 formed into an L-shaped configuration so as to engage the front end face of the IC card 20. By turning the arms 14 clockwise within the holder housing 10, the follower slide arms are retracted simultaneously. Alternatively, since the slide arms are engaged with the front end face of the inserted IC card 20, both the slide arms and the IC card also are advanced simultaneously.

Numeral 40 denotes a door locking mechanism provided on the upper portion of the insertion port of the holder housing 10. The door locking mechanism is comprised of a button 41, a spring 42 and an L-shaped lock member 43 comprising an actuating piece 43a and an engaging piece 43b. The lock member 43 is pivotally supported on the holder housing 10 in a state biased clockwise about a support shaft 45. The engaging piece 43b has a pawl 44 which fits into a recess 18 formed in the upper surface portion of the door 1, thereby locking the door 1 in a state closing the insertion/ejection port of the holder housing 10. Numeral 19 denotes a card rest formed inside the holder housing 10.

The button 41 is biased to the right in the figures at all times by the elastic force of the spring 42. When the button 41 is depressed, its distal end portion projecting into the holder housing 10 pushes the actuating piece 43a of the lock member 43 to move the pawl 44 of the engaging piece upward, thereby releasing the lock.

Figure 4:
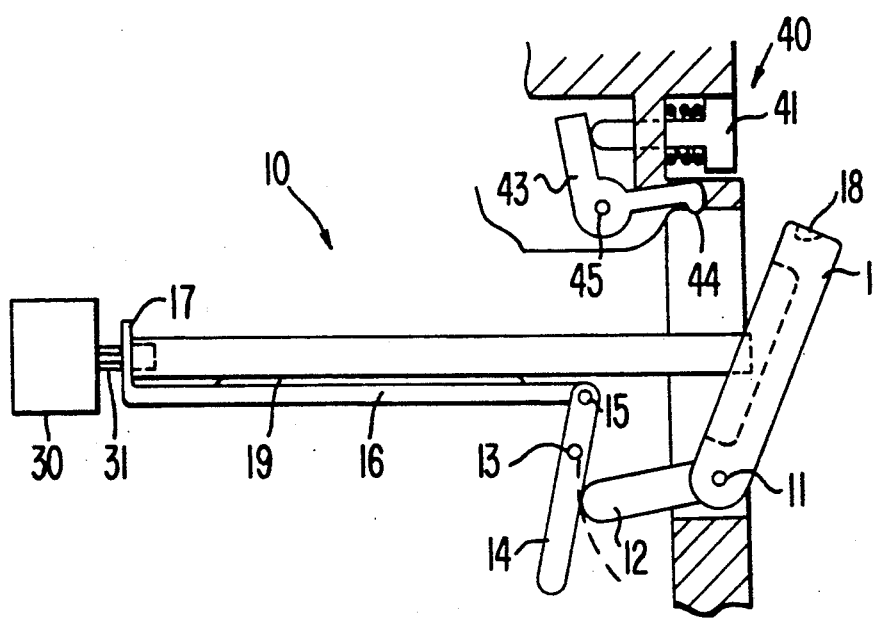
FIG. 4 is a partial sectional view illustrating the operation of the invention.

Reference will now be had to FIG. 4 to describe the operations for inserting the IC card into the sealed holder of the embodiment thus constructed and subsequently extracting it from the card socket.

First, in order to open the closed door 1 when the IC card 20 is accommodated in the holder housing 10, the button 41 is depressed to turn the lock member 43 and unmate the pawl 44 from the recess 18 of door 1, thereby unlocking the door 1. The door 1 is then opened by a handle, not shown.

Next, the IC card 20 is inserted from the insertion/ejection port and is placed on the card rest 19 with its connector portion situated toward the front. This is followed by performing an operation to close the insertion/ejection port. When this is done, the rear end face of the IC card 20 is pushed by the inner surface of the pivoting door 1, so that the follower slide arms 16a, 16b advance in the direction of the card socket 30 together with the IC card 20 owing to the L-shaped engagement portion 17 which engages with the front end face of the IC card 20. The card socket 30, which is at the deepest part of the holder housing 10, is secured at a position where the distance between it and the insertion/ejection port is equal to the distance between the front and rear end faces of the IC card 20 inserted therein. When the IC card 20 has advanced this distance, its front-end connector portion fits into the card socket 30. With the contacts 22 of the IC card and the pins 31 of the socket 30 in full electrical contact, the door 1 is held closed owing to engagement between its recess 18 and the pawl 44 of the lock member 43, as a result of which dust or the like is prevented from penetrating the interior of the holder housing 10.

When the IC card 20 is extracted from the holder housing 10, first the door 1 is unlocked by pressing button 41 to disengage the pawl 44 of the lock member 43, after which the door opening operation is performed. In operative association with the pivoting motion of door 1 when the door is opened, the links 12 actuate the pivoting arms 14 to move the follower slide arms 16a, 16b rightward. When this is done, the engagement portions 17 embracing the IC card 20 from the right and left at its front end face apply a retracting force to the IC card 20, whereby the latter is pulled out of the card socket 30 and moved toward the insertion port. Accordingly, the IC card 20 on the card rest 19 inside the holder is ejected without being subjected to an impact from the insertion/ejection port.

Though an embodiment of the present invention has been described, the invention is not limited thereto but can be modified in a variety of ways without departing from the scope of the claims.

The sealed holder for IC cards according to the present invention is used in IC card readers and writers, which are a cause of IC card contamination, employed in a poor environment, such as in a factory. The holder is capable of improving operability.

I claim:

1. A sealed holder for an IC card in which an IC card formed into a card shape and having an imbedded IC chip is accommodated in withdrawable and insertable fashion in order to perform a transfer of data via a connector portion provided on a front end face of said card, comprising:
- a holder housing having an insertion/ejection port at one end thereof for said IC card;
- a card socket provided within the holder housing at a position at which a distance between the card socket and said insertion/withdrawal port is equal to a distance between front and rear end faces of the IC card inserted therein, said card socket being adapted to mate with said connector portion on said front end face of said card when said card is fully inserted into said housing;
- a pivoting door pivotally supported on said holder housing and adapted to be pivoted while the rear end face of the IC card inserted therein is pushed, thereby closing the insertion/ejection port so as to hold the interior of the holder housing in a sealed state; and
- means operatively associated with said door whereby when said door is opened, said means operates to apply an extracting force to the IC card.

2. A sealed holder for an IC card according to claim 1 which includes a locking mechanism for locking said pivoting door when said door is in a closed position.

3. A sealed holder for an IC card according to claim 2, wherein said locking mechanism comprises a locking member which engages said door when said door is in a closed position and a releasing member for releasing said locking member from engagement with said door when said door is to be opened.

4. A sealed holder for an IC card according to claim 3 wherein said engaging member has an engaging portion bent into an L-shaped configuration for engaging the front end surface of the IC card.

5. A sealed holder for an IC card according to claim 1 wherein said card socket in said holder housing is removable from said housing whereby it may be exchanged for different sized sockets to accommodate different IC cards and is located at a position conforming to the distance between the front and rear surfaces of the IC card.

6. A sealed holder for an IC card according to claim 1 wherein said pivoting door is pivotally supported at a lower end portion of the insertion/ejection port of said holder housing and means are provided for biasing said door about a shaft thereof in a rotational direction which closes the door.

7. A sealed holder for an IC card in which an IC card formed into a card shape and having an imbedded IC chip is accommodated in withdrawable and insertable fashion in order to perform a transfer of data via a connector portion provided on a front end face of the card, comprising:
- a holder housing formed to have an insertion/ejection port for said IC card;
- a card socket provided within the holder housing at a position at which a distance between the card socket and said insertion/withdrawal port is equal to a distance between front and rear end faces of the IC card inserted therein;
- a pivoting door pivotally supported on said holder housing and adapted to be pivoted while the rear end face of the IC card inserted therein is pushed, thereby closing the insertion/ejection port so as to hold the interior of the holder housing in a sealed state; and
- means operatively associated with said door whereby when said door is opened, said means operates to apply an extracting force to the IC card; said means for applying an extracting force to the IC card comprising an engaging member for engaging the front end face of said IC card, and a transmission member for converting pivoting motion of said pivoting door into back-and-forth motion of the engaging member.

8. A sealed holder for an IC card according to claim 7 wherein said engaging member has an engaging portion bent into an L-shaped configuration for engaging the front end surface of the IC card.

9. A sealed holder for an IC card in which an IC card formed into a card shape and having an imbedded IC chip is accommodated in withdrawable and insertable fashion in order to perform a transfer of data via a connector portion provided on a front end face of the card, comprising:
- a holder housing formed to have an insertion/ejection port for said IC card;
- a card socket provided within the holder housing at a position at which a distance between the card socket and said insertion/withdrawal port is equal to a distance between front and rear end faces of the IC card inserted therein;
- a pivoting door pivotally supported on said holder housing and adapted to be pivoted while the rear end face of the IC card inserted therein is pushed, thereby closing the insertion/ejection port so as to hold the interior of the holder housing in a sealed state;
- a locking mechanism for said pivoting door when said door is in a closed position; and
- means operatively associated with said door whereby when said door is opened, said means operates to apply an extracting force to the IC card; said means for applying an extracting force to the IC card comprising an engaging member for engaging the front end face of said IC card, and a transmission member for converting pivoting motion of said pivoting door into back-and-forth motion of the engaging member.

* * * * *

UNITED STATES PATENT AND TRADEMARK OFFICE
CERTIFICATE OF CORRECTION

PATENT NO. : 5,028,767
DATED : July 2, 1991
INVENTOR(S) : YUTAKA MIZUNO It is certified that error appears in the above-identified patent and that said Letters Patent is hereby corrected as shown below:

ON TITLE PAGE: [56] References Cited insert

```
        --FOREIGN PATENT DOCUMENTS
   0041261    12/1981    Europe
   2077013    12/1981    Great Britain
   3518247    11/1986    Germany--.
```

Column 5, line 40, after "rear" insert --end--.

Signed and Sealed this

Twelfth Day of January, 1993

*Attest:*

DOUGLAS B. COMER

*Attesting Officer*   *Acting Commissioner of Patents and Trademarks*